(12) United States Patent
Rajaa et al.

(10) Patent No.: US 9,047,108 B1
(45) Date of Patent: Jun. 2, 2015

(54) SYSTEMS AND METHODS FOR MIGRATING REPLICATED VIRTUAL MACHINE DISKS

(75) Inventors: Subash Rajaa, Pune (IN); Sanjay Kumar, Bihar (IN)

(73) Assignee: Symantec Corporation, Mountain View, CA (US)

( * ) Notice: Subject to any disclaimer, the term of this patent is extended or adjusted under 35 U.S.C. 154(b) by 247 days.

(21) Appl. No.: 13/607,463

(22) Filed: Sep. 7, 2012

(51) Int. Cl.
*G06F 9/455* (2006.01)
*G06F 9/48* (2006.01)

(52) U.S. Cl.
CPC .............. *G06F 9/455* (2013.01); *G06F 9/4856* (2013.01); *G06F 2009/45562* (2013.01); *G06F 2009/4557* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 2003/0188114 A1* | 10/2003 | Lubbers et al. | 711/162 |
| 2006/0021029 A1* | 1/2006 | Brickell et al. | 726/22 |
| 2009/0222496 A1* | 9/2009 | Liu et al. | 707/204 |
| 2010/0106885 A1* | 4/2010 | Gao et al. | 711/6 |
| 2012/0084445 A1* | 4/2012 | Brock et al. | 709/226 |
| 2014/0033201 A1* | 1/2014 | Dawkins et al. | 718/1 |

* cited by examiner

*Primary Examiner* — Emerson Puente
*Assistant Examiner* — Jonathan R Labud
(74) *Attorney, Agent, or Firm* — ALG Intellectual Property, LLC

(57) ABSTRACT

A computer-implemented method for migrating replicated virtual machine disks may include 1) replicating a virtual machine disk from an initial data store at a primary site to an initial data store at a secondary site to create a replicated virtual machine disk, 2) identifying a request to migrate the virtual machine disk within the primary site, 3) pausing replication of the virtual machine disk and mirroring the virtual machine disk from the initial data store a subsequent data store at the primary site, mirroring the replicated virtual machine disk from the initial data store to a subsequent data store at the secondary site, and 4) upon mirroring, resuming replication of the virtual machine disk by replicating the virtual machine disk from the subsequent data store at the primary site to the subsequent data store at the secondary site. Various other methods, systems, and computer-readable media are also disclosed.

20 Claims, 6 Drawing Sheets

SYSTEMS AND METHODS FOR MIGRATING REPLICATED VIRTUAL MACHINE DISKS

BACKGROUND

Virtual machines may provide a variety of advantages over traditional, physical computing systems. For example, a virtualization host may execute multiple virtual machines. In addition, one may migrate the virtual machine itself (e.g., the virtual process), as well as the virtual machine disk on which the virtual machine operates, between different hardware configurations.

Entities often replicate data from a primary site to a secondary site for disaster recovery purposes. For example, if the primary site fails, then a fully complete, or substantially complete, replicated copy should be available at the secondary site in order to avoid interruptions and/or data loss.

When one attempts to migrate a virtual machine disk from an initial data store to a subsequent data store, this may cause conflicts with the goal of data replication. For example, an initial data store may be replicating one or more virtual machine disks, and a subsequent data store may also be replicating one or more virtual machine disks that are different from those being replicated at the initial data store. When a virtual machine disk is migrated from the initial data store to the subsequent data store, the subsequent data store may trigger a full synchronization operation in order to ensure that the migrated virtual machine disk is protected by replication. Unfortunately, full synchronization operations may introduce tremendous performance overheads due to transmitting virtual machine disks on the order of hundreds of gigabytes across a wide area network (or other similar network).

SUMMARY

As will be described in greater detail below, the instant disclosure generally relates to systems and methods for migrating replicated virtual machine disks. In one example, a computer-implemented method for migrating replicated virtual machine disks may include 1) replicating a virtual machine disk from an initial data store at a primary site to an initial data store at a secondary site to create a replicated virtual machine disk, 2) identifying a request to migrate the virtual machine disk within the primary site, 3) in response to identifying the request: pausing replication of the virtual machine disk, mirroring the virtual machine disk from the initial data store at the primary site to a subsequent data store at the primary site, and mirroring the replicated virtual machine disk from the initial data store at the secondary site to a subsequent data store at the secondary site, and 4) upon mirroring both the virtual machine disk and the replicated virtual machine disk, resuming replication of the virtual machine disk by replicating the virtual machine disk from the subsequent data store at the primary site to the subsequent data store at the secondary site.

In some examples, the following operations may occur in parallel: (1) mirroring the virtual machine disk from the initial data store at the primary site to the subsequent data store at the primary site and (2) mirroring the replicated virtual machine disk from the initial data store at the secondary site to the subsequent data store at the secondary site. In addition, the request to migrate the virtual machine may include a request to migrate the virtual machine disk to a new storage location at the primary site.

In one example, replication from the primary site to the secondary site may occur asynchronously. In that case, the method may include, in response to identifying the request, identifying a change log that records changes made to the virtual machine disk. In addition, mirroring the virtual machine disk from the initial data store to the subsequent data store at the primary site may include mirroring both the virtual machine disk and the change log. Resuming replication may also include updating the virtual machine disk on the subsequent data store at the primary site based on the change log. In one embodiment, the change log may include a replication log that records asynchronous write operations that are pending on the secondary site and removes the write operations after the secondary site acknowledges receiving the write operations.

The method may also include confirming, upon mirroring both the virtual machine disk and the replicated virtual machine disk, that (1) the initial and the subsequent data stores at the primary site are in a synchronized state and that (2) the initial and the subsequent data stores at the secondary site are in a synchronized state.

In some examples, resuming replication may include performing the following in response to confirming the synchronized states: (1) freezing input/output operations associated with the virtual machine disk and (2) ceasing replication from the initial data store at the primary site to the initial data store at the secondary site. Resuming replication may also include removing the virtual machine disk from the initial data store at the primary site.

In some embodiments, the virtual machine disk may be replicated using hardware replication. Mirroring the virtual machine disk may also include performing the following in response to identifying the request: (1) taking a snapshot of the virtual machine disk on the initial data store at the primary site and (2) redirecting new writes from the virtual machine disk on the initial data store at the primary site to the snapshot. Mirroring the virtual machine disk may also include, in response to identifying the request, transmitting an instruction to the subsequent data store at the primary site to cease replicating regions of a logical disk on the subsequent data store corresponding to the virtual machine disk at the primary site.

Mirroring the virtual machine disk may also include placing a marker on the virtual machine disk on the initial data store at the primary site. Mirroring the virtual machine disk may also include, upon recognizing the arrival of the marker on the replicated virtual machine disk, determining that the virtual machine disks on the data stores are synchronized. Mirroring the virtual machine disk may also include mirroring the virtual machine disk and the snapshot upon recognizing, through replication, the arrival of the marker on the replicated virtual machine disk on the initial data store at the secondary site.

In one example, resuming replication may include deleting the snapshot. Resuming replication may also include instructing a virtual machine corresponding to the virtual machine disk to use the virtual machine disk on the subsequent data store at the primary site. In one embodiment, the instruction may cause a merger of the snapshot and the virtual machine disk. In this embodiment, the merger may be replicated to the subsequent data store at the secondary site.

In one embodiment, a system for implementing the above-described method may include 1) a replication module programmed to replicate a virtual machine disk from an initial data store at a primary site to an initial data store at a secondary site to create a replicated virtual machine disk, 2) an identification module programmed to identify a request to migrate the virtual machine disk within the primary site, 3) a pausing module programmed to pause replication of the virtual machine disk in response to identifying the request, 4) a mirroring module programmed to both mirror the virtual machine disk from the initial data store at the primary site to a subsequent data store at the primary site and mirror the replicated virtual machine disk from the initial data store at the secondary site to a subsequent data store at the secondary site, and 5) at least one processor configured to execute the replication module, the identification module, the pausing module, and the mirroring module. The replication module may be further programmed to, upon mirroring both the virtual machine disk and the replicated virtual machine disk, resume replication of the virtual machine disk by replicating the virtual machine disk from the subsequent data store at the primary site to the subsequent data store at the secondary site.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) replicate a virtual machine disk from an initial data store at a primary site to an initial data store at a secondary site to create a replicated virtual machine disk, 2) identify a request to migrate the virtual machine disk within the primary site, 3) in response to identifying the request: pause replication of the virtual machine disk, mirror the virtual machine disk from the initial data store at the primary site to a subsequent data store at the primary site, and mirror the replicated virtual machine disk from the initial data store at the secondary site to a subsequent data store at the secondary site, and 4) upon mirroring both the virtual machine disk and the replicated virtual machine disk, resume replication of the virtual machine disk by replicating the virtual machine disk from the subsequent data store at the primary site to the subsequent data store at the secondary site.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
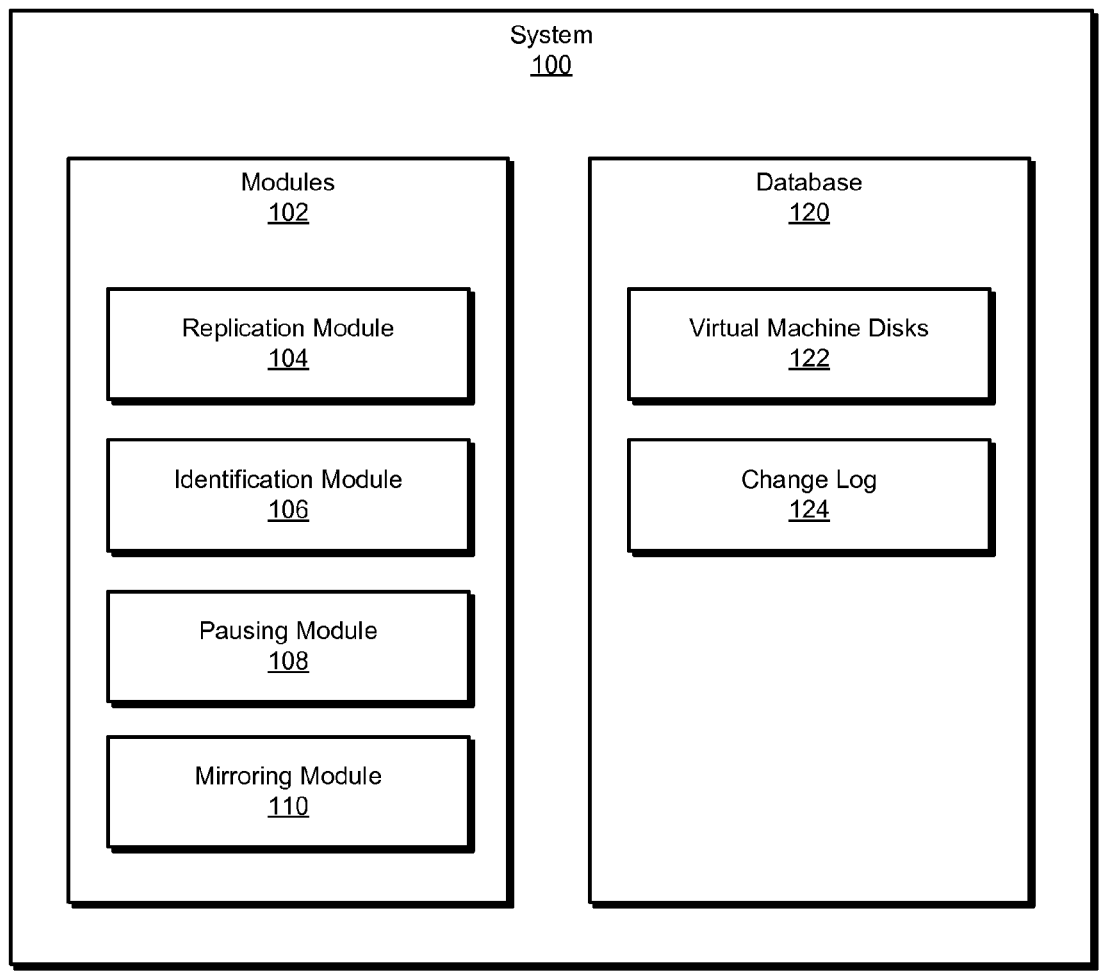
FIG. 1 is a block diagram of an exemplary system for migrating replicated virtual machine disks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for migrating replicated virtual machine disks. As will be explained in greater detail below, the systems and methods described herein may enable a replicated virtual machine disk to be migrated to a new data store at a primary site while preserving replication at the new data store. These systems and methods may also enable the virtual machine disk to be migrated without performing a full synchronization operation between the primary site and the secondary site. Instead, the secondary site may mirror the current virtual machine disk to a subsequent data store at the secondary site, thereby transferring data locally instead of between the primary site and the secondary site. As such, the systems and methods described herein may perform a seamless virtual machine disk migration while avoiding the significant performance costs typically associated with conventional migration and replication techniques.

Figure 2:
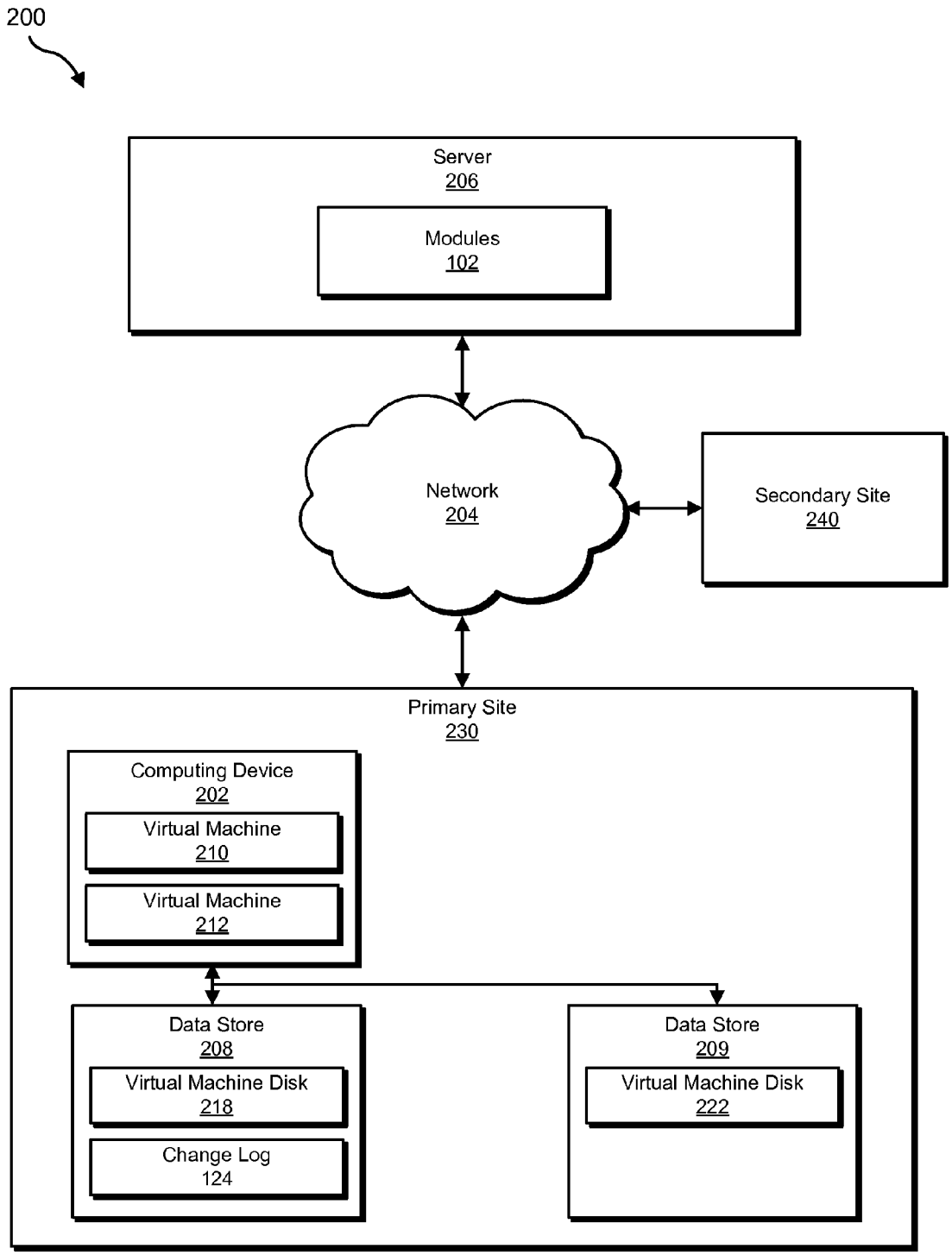
FIG. 2 is a block diagram of an exemplary system for migrating replicated virtual machine disks.

The following will provide, with reference to FIGS. 1-2, detailed descriptions of exemplary systems for migrating replicated virtual machine disks. Detailed descriptions of corresponding computer-implemented methods will also be provided in connection with FIG. 3. Detailed descriptions of software and hardware replication of virtual machine disks will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for migrating replicated virtual machine disks. As illustrated in this figure, exemplary system 100 may include one or more modules 102 for performing one or more tasks. For example, and as will be explained in greater detail below, exemplary system 100 may include a replication module 104 programmed to replicate a virtual machine disk from an initial data store at a primary site to an initial data store at a secondary site to create a replicated virtual machine disk. Exemplary system 100 may also include an identification module 106 programmed to identify a request to migrate the virtual machine disk within the primary site.

In addition, and as will be described in greater detail below, exemplary system 100 may include a pausing module 108 programmed to pause replication of the virtual machine disk in response to identifying the request. System 100 may also include a mirroring module 110 programmed to both mirror the virtual machine disk from the initial data store at the primary site to a subsequent data store at the primary site and mirror the replicated virtual machine disk from the initial data store at the secondary site to a subsequent data store at the secondary site. Although illustrated as separate elements, one or more of modules 102 in FIG. 1 may represent portions of a single module or application. Replication module 104 may be further programmed to, upon mirroring both the virtual machine disk and the replicated virtual machine disk, resume replication of the virtual machine disk by replicating the virtual machine disk from the subsequent data store at the primary site to the subsequent data store at the secondary site, In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store virtual machine disks 122. Virtual machine disks 122 may contain the data on which virtual machines in system 100 operate. Virtual machines may also migrate from one virtual machine disk on one data store to another virtual machine disk on another data store, as discussed in greater detail below. Such data stores may include a logical disk or logical unit number (LUN). Database 120 may also be configured to store a change log 124. Change log 124 may represent a generic change log, a replication log, a metadata log, a bitmap, or any other suitable log for recording attempted changes to a virtual machine disk. Change log 124 may also preserve write order fidelity of changes or write operations attempted on a virtual machine disk.

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, facilitate computing device 202 and/or server 206 in migrating replicated virtual machine disks. For example, and as will be described in greater detail below, one or more of modules 102 may cause computing device 202 and/or server 206 to 1) replicate a virtual machine disk from an initial data store at a primary site to an initial data store at a secondary site to create a replicated virtual machine disk, 2) identify a request to migrate the virtual machine disk within the primary site, 3) in response to identifying the request: pause replication of the virtual machine disk, mirror the virtual machine disk from the initial data store at the primary site to a subsequent data store at the primary site, and mirror the replicated virtual machine disk from the initial data store at the secondary site to a subsequent data store at the secondary site, and 4) upon mirroring both the virtual machine disk and the replicated virtual machine disk, resume replication of the virtual machine disk by replicating the virtual machine disk from the subsequent data store at the primary site to the subsequent data store at the secondary site.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Server 206 generally represents any type or form of computing device that is capable of managing migration and/or replication of virtual machines among client hosts connected to server 206. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server 206.

In the example of FIG. 2, server 206 may contain each of replication module 104, identification module 106, pausing module 108, and mirroring module 110. Server 206 may manage migration of a virtual machine disk, such as virtual machine disk 218 from one data store (such as data store 208) to another (such as data store 209). Data store 209 may include its own virtual machine disks, such as virtual machine disk 222, which may be a mirrored copy of virtual machine disk 218, as discussed below in connection with FIG. 4. Server 206 may also manage a computing device, which may include a virtualization host, that hosts virtual machines, such as virtual machines 210 and 212. Virtual machines 210 and 212 may execute upon virtual machine disks such as virtual machine disks 218 and 222. Server 206 may also manage replication from a primary site 230 that contains computing device 202 to a parallel secondary site 240 for disaster recovery. Server 206 may ensure that one or more of data stores 208 and 209 are replicated to secondary site 240.

Figure 3:
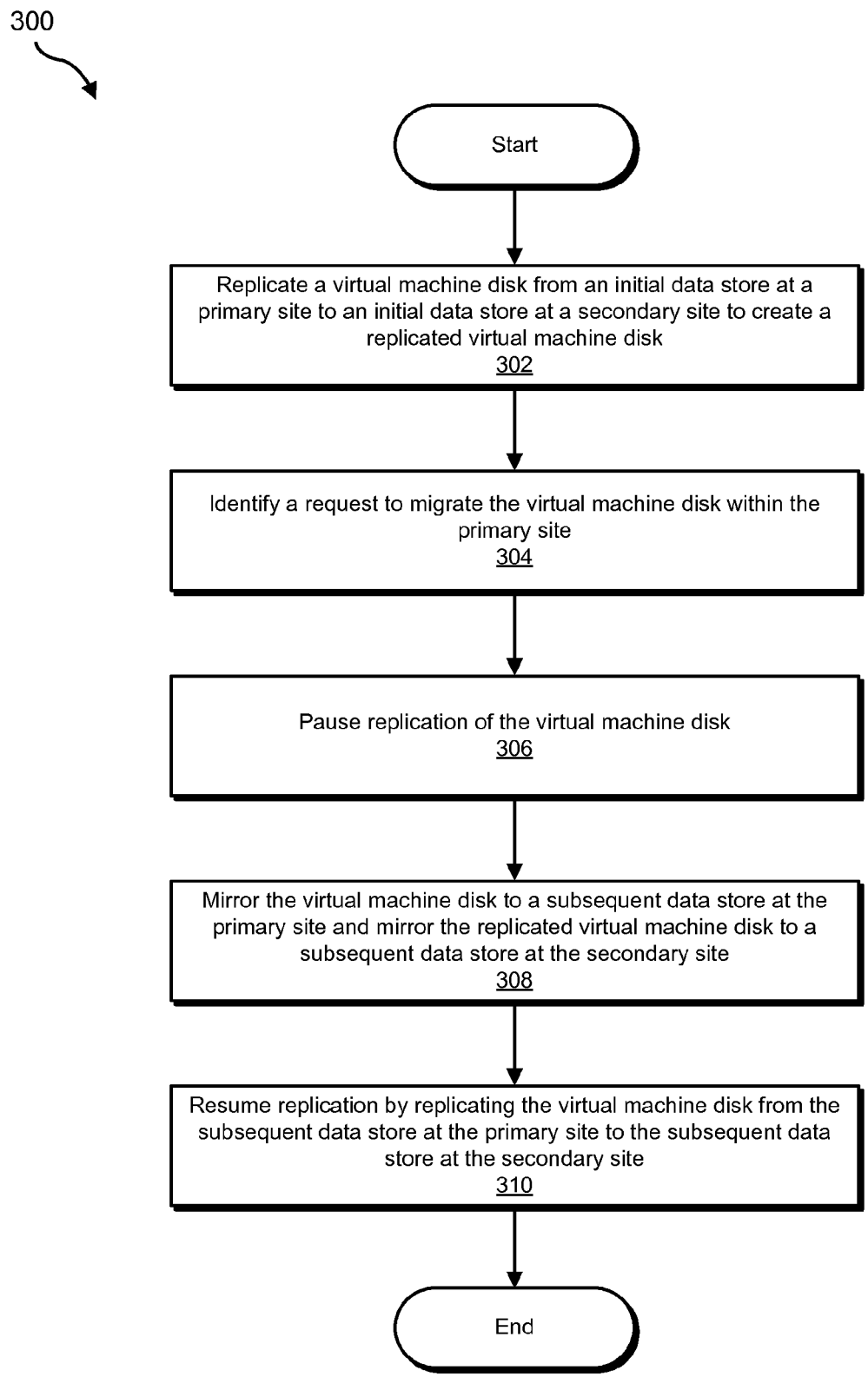
FIG. 3 is a flow diagram of an exemplary method for migrating replicated virtual machine disks.

FIG. 3 is a flow diagram of an exemplary computer-implemented method 300 for migrating replicated virtual machine disks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

At step 302, one or more of the systems described herein may replicate a virtual machine disk from an initial data store at a primary site to an initial data store at a secondary site to create a replicated virtual machine disk. For example, replication module 104 may replicate a virtual machine disk from an initial data store at a primary site to an initial data store at a secondary site to create a replicated virtual machine disk.

Replication module 104 may replicate the virtual machine disk from an initial data store at a primary site to an initial data store at a secondary site in a variety of manners. For example, replication module 104 may replicate the virtual machine disk synchronously. In synchronous replication, replication module 104 may only report that a write operation is successful after the write operation is performed on both the primary site and secondary site. In other examples, replication module 104 may also replicate the virtual machine disk asynchronously. In asynchronous replication, replication module 104, or a corresponding application, may report that a write operation is successful as soon as the write operation is performed on the primary site. In that case, there may be a delay until the write operation is performed on the secondary site.

Figure 4:
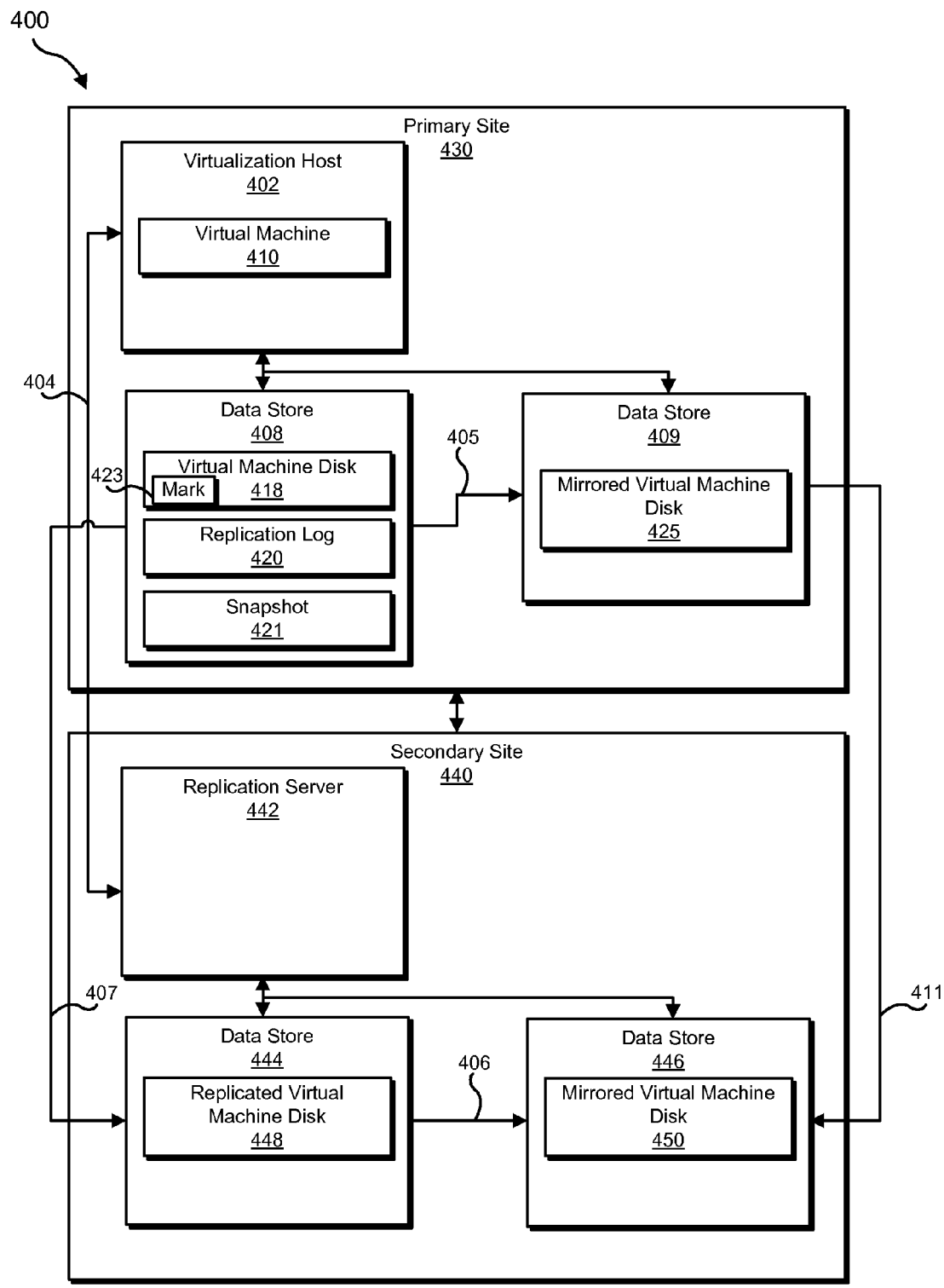
FIG. 4 is a block diagram of an exemplary system for software and hardware replication.

FIG. 4 is a block diagram 400 of a system for migrating replicated virtual machine disks. FIG. 4 provides an example of a replication system in which replication module 104 might operate. As shown in FIG. 4, a virtualization host 402 may host at least one virtual machine, such as virtual machine 410. Virtualization host 402 may be connected to one or more data stores, such as data stores 408 and 409. These data stores may store the virtual machine disk on which virtual machine 410 executes, such as virtual machine disk 418.

Replication module 104 may also replicate the virtual machine disk using software replication. In software replication, specialized software at the application or operating system level at the primary site may intercept write operations and replicate them to the secondary site. For example, replication module 104 might execute at virtualization host 402 in FIG. 4, intercept write operations, and replicate 404 them to replication server 442 for recording on data store 444 or 446. Software replication may be agnostic to the underlying type or brand of data store hardware. Software replication may thereby be compatible with various, or any, type or brand of data store hardware.

Replication module 104 may also replicate the virtual machine disk using hardware replication. In hardware replication, write operations on a data store at the primary site may be automatically replicated, at a hardware level, to a corresponding data store at the secondary site. Hardware replication may not require the installation of any specialized software on the virtualization host, such as virtualization host 402. In contrast to hardware-agnostic software replication, hardware replication may require that both the primary and secondary data stores use the same type or brand (i.e., system) of hardware replication. In the example of FIG. 4, data store 408 and data store 409 may have hardware configured to replicate through connections 407 and 411, respectively, to data store 444 and data store 446.

Returning to FIG. 3, at step 304 one or more of the systems described herein may identify a request to migrate the virtual machine disk within the primary site. For example, identification module 106 may identify a request to migrate the virtual machine disk within the primary site.

Identification module 106 may identify the request to migrate the virtual machine disk in a variety of manners. For example, identification module 106 may identify a manual instruction to migrate the virtual machine disk from a human administrator. Identification module 106 may also automatically generate a request or instruction to migrate the virtual machine disk. Identification module 106 may generate the request to migrate the virtual machine disk based on a variety of factors. These factors may include scheduled maintenance, data store failure, a connectivity failure, and load balancing. Identification module 106 may also generate a recommendation for migrating the virtual machine disk for confirmation by a human administrator.

The request to migrate the virtual machine may include a request to migrate the virtual machine disk to a new storage location at the primary site. In the example of FIG. 4, the request to migrate the virtual machine disk may include a request to migrate virtual machine disk 418 from data store 408 to data store 409.

Returning to FIG. 3, at step 306 one or more of the systems described herein may, in response to identifying the request, pause replication of the virtual machine disk. For example, pausing module 108 may pause replication of the virtual machine disk in response to identifying the request.

Pausing module 108 may pause replication in a variety of manners. In the example of FIG. 4, pausing module 108 may pause replication between data store 408 on primary site 430 and data store 444 on secondary site 440. Pausing module 108 may pause replication of an entire data store containing the virtual machine disk. Pausing module 108 may also pause replication of only a portion of a data store corresponding to the virtual machine disk. Pausing module 108 may also transmit an instruction to the subsequent data store at the primary site to cease replicating regions of a logical disk on the subsequent data store corresponding to the virtual machine disk at the primary site.

Although shown at step 306 of FIG. 3, pausing module 108 may instead pause replication after mirroring module 110 performs step 308, as discussed below. For example, pausing module 108 may pause replication after performing the above-described mirroring operating during software replication.

For asynchronous replication, pausing module 108, or another module in system 100, may also record changes made to the virtual machine disk on a change log in response to identifying the request. The change log may correspond to change log 124 in FIG. 1. For software replication, the change log may include a replication log that records asynchronous write operations that are pending on the secondary site, and that removes the write operations after the secondary site acknowledges receiving the write operations. For hardware replication, the change log may include a snapshot of a virtual machine disk.

Returning to FIG. 3, at step 308 one or more of the systems described herein may both (1) mirror the virtual machine disk from the initial data store at the primary site to a subsequent data store at the primary site and (2) mirror the replicated virtual machine disk from the initial data store at the secondary site to a subsequent data store at the secondary site. For example, mirroring module 110 may (1) mirror the virtual machine disk from the initial data store at the primary site to a subsequent data store at the primary site and (2) mirror the replicated virtual machine disk from the initial data store at the secondary site to a subsequent data store at the secondary site.

Mirroring module 110 may mirror the virtual machine disk and the replicated virtual machine disk in a variety of manners. For example, mirroring module 110 may mirror the virtual machine disk and the replicated virtual machine disk in parallel. That is, mirroring module 110 may perform the following operations in parallel: (1) mirroring the virtual machine disk from the initial data store at the primary site to the subsequent data store at the primary site and (2) mirroring the replicated virtual machine disk from the initial data store at the secondary site to the subsequent data store at the secondary site. The mirroring operations may be performed in parallel by mirroring the virtual machine disk and the replicated virtual machine disk during respective time periods that are identical, that are substantially identical, or that contain at least one point of overlap.

For asynchronous replication, mirroring module 110 may also mirror both the virtual machine disk and the change log to the subsequent data store on the primary site. In the example of FIG. 4, mirroring module 110 may mirror the virtual machine disk together with replication log 420 (e.g., for software replication) or snapshot 421 (e.g., for hardware replication), as discussed in greater detail below.

In the example of FIG. 4, mirroring module 110 may mirror 405 virtual machine disk 418 from data store 408 to data store 409. In parallel, or at another time, mirroring module 110 may also mirror 406 replicated virtual machine disk 448 from data store 444 to data store 446. Mirroring module 110 may thereby create mirrored virtual machine disk 425 and mirrored virtual machine disk 450. As used herein, the term "mirror" may be defined broadly as generic copying. In some embodiments, mirroring may refer to copying from a principal, active database (i.e., at the primary site) onto an inactive or otherwise inaccessible mirror database (i.e., at the secondary site). In some embodiments, mirroring may also refer to the mirroring functionality within the SQL database field, as distinct from replication, and as is known in the art. For hardware replication, mirroring may simply refer to raw data transfer.

For hardware replication, for example, mirroring module 110 may mirror the virtual machine disk in part by taking a snapshot of the virtual machine disk on the initial data store at the primary site. In the example of FIG. 4, mirroring module 110 may take a snapshot 421 of virtual machine disk 418. Mirroring module 110 may also redirect new writes from the virtual machine disk on the initial data store at the primary site to the snapshot. For example, mirroring module 110 may redirect new writes intended for virtual machine disk 418 instead to snapshot 421. At this time, mirroring module 110 (and/or pausing module 108, as discussed above) may transmit an instruction to the subsequent data store, such as data store 409, at the primary site to cease replicating regions of a logical disk on the subsequent data store corresponding to the virtual machine disk, such as virtual machine disk 418, at the primary site.

For hardware replication, for example, mirroring module 110 may also mirror the virtual machine disk in part by first placing a marker on the virtual machine disk on the initial data store at the primary site. In some examples, mirroring module 110 may place the marker on the virtual machine disk prior to pausing module 108 pausing replication at step 306 of FIG. 3. In the example of FIG. 4, mirroring module 110 may place a marker 423 on virtual machine disk 418.

Replication module 104 may then replicate virtual machine disk 418 from data store 408 to data store 444, as discussed above. Replication of virtual machine disk 418 will eventually include replication of marker 423 on virtual machine disk 418. Upon recognizing the arrival of the marker on the replicated virtual machine disk on the subsequent data store at the secondary site through replication, mirroring module 110 may determine that the virtual machine disks on the data stores are synchronized (i.e., that virtual machine disk 418 is in the same state as replicated virtual machine disk 448). Mirroring module 110 may then mirror the virtual machine disk and the snapshot, as well as the replicated virtual machine disk to the subsequent data stores on the primary site and secondary site, respectively (i.e., data store 409 and data store 446).

Returning to FIG. 3, at step 310 one or more of the systems described herein may, upon mirroring both the virtual machine disk and the replicated virtual machine disk, resume replication of the virtual machine disk by replicating the virtual machine disk from the subsequent data store at the primary site to the subsequent data store at the secondary site. For example, replication module 104 may resume replication of the virtual machine disk by replicating the virtual machine disk from the subsequent data store at the primary site to the subsequent data store at the secondary site.

Replication module 104 may resume replication of the virtual machine disk in a variety of manners. For asynchronous replication, for example, replication module 104 may resume replication by updating the virtual machine disk on the subsequent data store at the primary site based on the change log. For software replication, replication module 104 may resume replication by applying the longest pending (i.e., earliest) write operation recorded in the replication log.

Replication module 104 may also resume replication in part by instructing a virtual machine corresponding to the virtual machine disk to use the virtual machine disk on the subsequent data store at the primary site. In the example of FIG. 4, replication module 104 may instruct virtual machine 410 to use mirrored virtual machine disk 425.

For hardware replication, replication module 104 may resume replication in part by causing a merger of the snapshot (e.g., snapshot 421) and the virtual machine disk at the subsequent data store on the primary site (e.g., mirrored virtual machine disk 425). Replication module 104 may also replicate the merger to the subsequent data store at the secondary site (e.g., data store 446).

Replication module 104 may also resume replication in part by removing the virtual machine disk from the initial data store at the primary site. Replication module 104 may also resume replication in part by deleting the snapshot. In the example of FIG. 4, replication module 104 may remove or delete both virtual machine disk 418 and snapshot 421, thereby completing the migration from data store 408 to data store 409.

As explained above, the systems and methods described herein may enable a replicated virtual machine disk to be migrated to a new data store at a primary site while preserving replication at the new data store. These systems and methods may also enable the virtual machine disk to be migrated without performing a full synchronization operation between the primary site and the secondary site. Instead, the secondary site may mirror the current virtual machine disk to a subsequent data store at the secondary site, thereby transferring data locally instead of between the primary site and the secondary site. As such, the systems and methods described herein may perform a seamless virtual machine disk migration while avoiding the significant performance costs typically associated with conventional migration and replication techniques.

Figure 5:
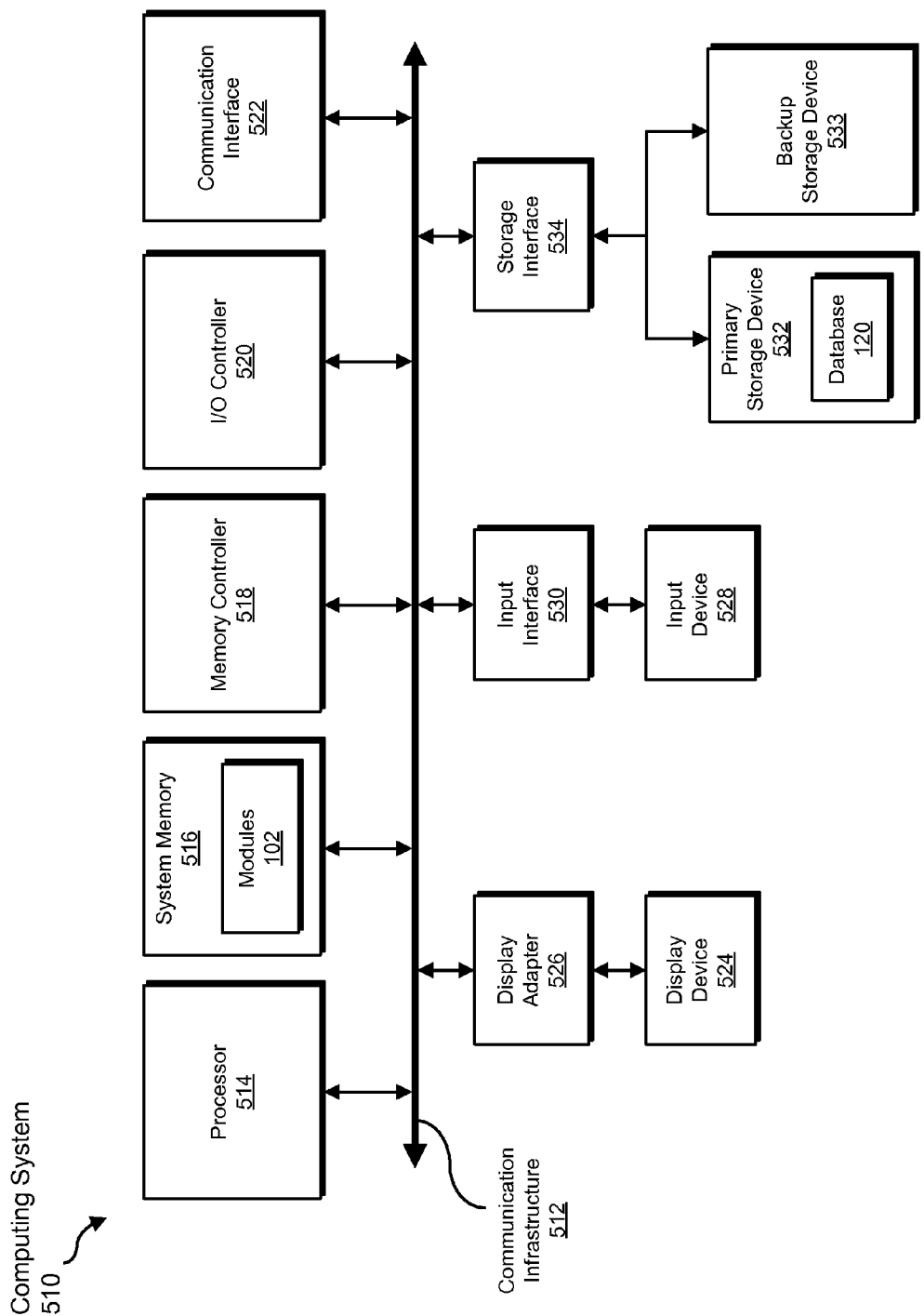
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the replicating, identifying, pausing, mirroring, resuming, recording, removing, deleting, confirming, performing, taking, redirecting, transmitting, placing, recognizing, freezing, ceasing, instructing, and causing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
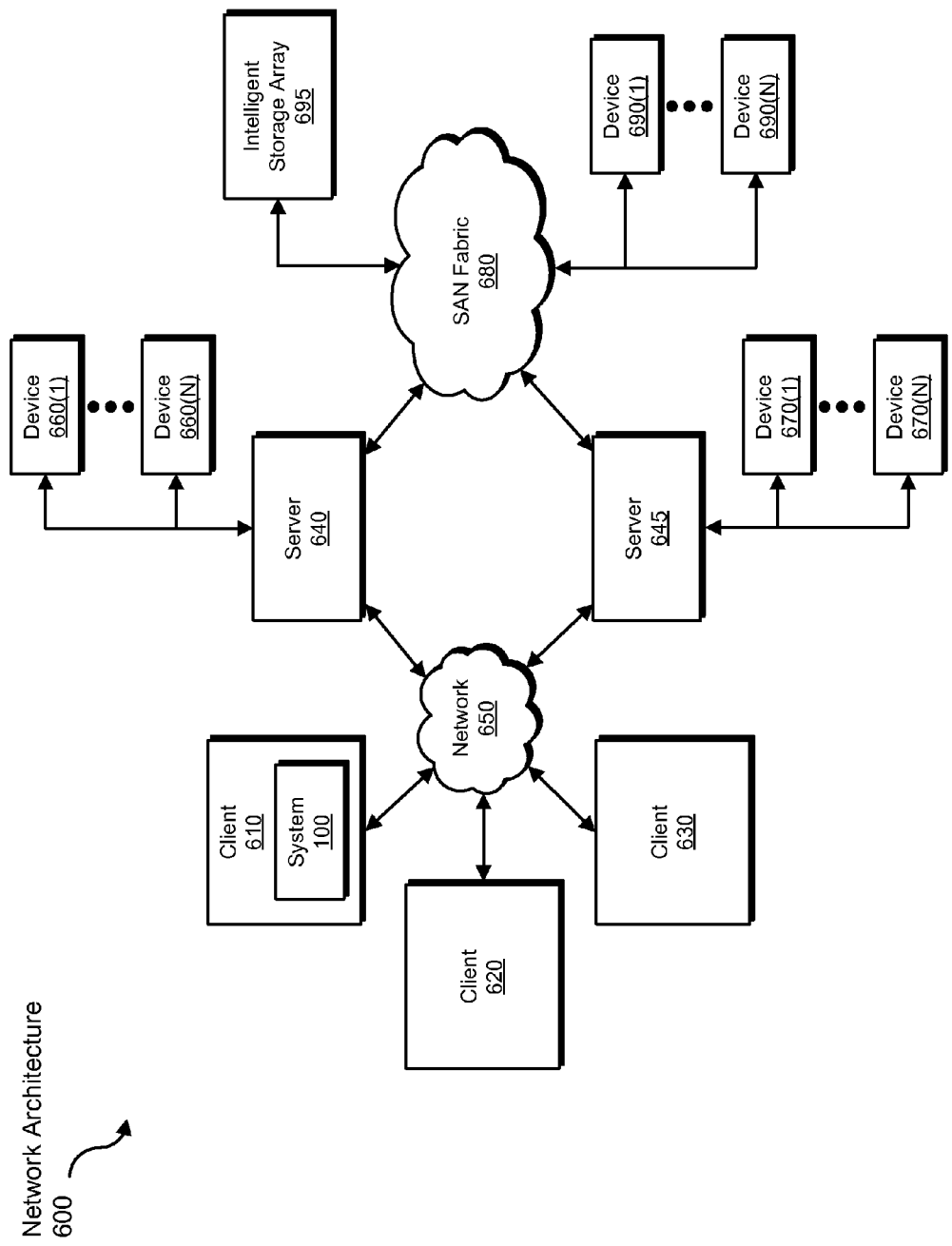
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the replicating, identifying, pausing, mirroring, resuming, recording, removing, deleting, confirming, performing, taking, redirecting, transmitting, placing, recognizing, freezing, ceasing, instructing, and causing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660 (1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for migrating replicated virtual machine disks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a request to migrate a virtual machine disk, transform the request by creating instructions to pause replication and mirror virtual machine disks, and output a result of the transformation by migrating the virtual machine disk to a different data store. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for migrating replicated virtual machine disks, at least a portion of the method being performed by a computing device comprising at least one processor, the method comprising:
   replicating a virtual machine disk from an initial data store at a primary site to an initial data store at a secondary site to create a replicated virtual machine disk;
   identifying a request to migrate the virtual machine disk within the primary site;
   in response to identifying the request:
   pausing replication of the virtual machine disk;
   mirroring the virtual machine disk from the initial data store at the primary site to a subsequent data store at the primary site;
   mirroring the replicated virtual machine disk from the initial data store at the secondary site to a subsequent data store at the secondary site;
   upon mirroring both the virtual machine disk and the replicated virtual machine disk, resuming replication of the virtual machine disk by replicating the virtual machine disk from the subsequent data store at the primary site to the subsequent data store at the secondary site.

2. The computer-implemented method of claim 1, wherein the following occur in parallel:
   mirroring the virtual machine disk from the initial data store at the primary site to the subsequent data store at the primary site;
   mirroring the replicated virtual machine disk from the initial data store at the secondary site to the subsequent data store at the secondary site.

3. The computer-implemented method of claim 1, wherein the request to migrate the virtual machine disk comprises a request to migrate the virtual machine disk to a new storage location at the primary site.

4. The computer-implemented method of claim 1, further comprising, in response to identifying the request, identifying a change log associated with the virtual machine disk, wherein:
- replication from the primary site to the secondary site occurs asynchronously;
- mirroring the virtual machine disk from the initial data store to the subsequent data store at the primary site comprises mirroring both the virtual machine disk and the change log;
- resuming replication comprises updating the virtual machine disk on the subsequent data store at the primary site based on the change log.

5. The computer-implemented method of claim 4, wherein the virtual machine disk is replicated using software replication.

6. The computer-implemented method of claim 5, wherein the change log comprises a replication log that:
- records asynchronous write operations that are pending on the secondary site;
- removes the write operations after the secondary site acknowledges receiving the write operations.

7. The computer-implemented method of claim 6, further comprising, upon mirroring both the virtual machine disk and the replicated virtual machine disk:
- confirming that the initial and the subsequent data stores at the primary site are in a synchronized state;
- confirming that the initial and the subsequent data stores at the secondary site are in a synchronized state.

8. The computer-implemented method of claim 7, wherein resuming replication comprises performing the following in response to confirming the synchronized states:
- freezing input/output operations associated with the virtual machine disk;
- ceasing replication from the initial data store at the primary site to the initial data store at the secondary site.

9. The computer-implemented method of claim 8, wherein resuming replication comprises removing the virtual machine disk from the initial data store at the primary site.

10. The computer-implemented method of claim 4, wherein the virtual machine disk is replicated using hardware replication.

11. The computer-implemented method of claim 10, wherein mirroring the virtual machine disk comprises performing the following in response to identifying the request:
- taking a snapshot of the virtual machine disk on the initial data store at the primary site;
- redirecting new writes from the virtual machine disk on the initial data store at the primary site to the snapshot.

12. The computer-implemented method of claim 10, wherein pausing replication comprises, in response to identifying the request, transmitting an instruction to a target storage array at the secondary site to cease replicating regions of a logical disk on the target storage array corresponding to the virtual machine disk at the primary site.

13. The computer-implemented method of claim 11, wherein mirroring the virtual machine disk comprises:
- placing a marker on the virtual machine disk on the initial data store at the primary site;
- upon recognizing the arrival of the marker on the replicated virtual machine disk on the subsequent data store at the secondary site through replication, determining that the virtual machine disks on the data stores are synchronized.

14. The computer-implemented method of claim 13, wherein mirroring the virtual machine disk comprises mirroring the virtual machine disk and the snapshot upon recognizing, through replication, the arrival of the marker on the replicated virtual machine disk on the initial data store at the secondary site.

15. The computer-implemented method of claim 11, wherein resuming replication comprises deleting the snapshot.

16. The computer-implemented method of claim 11, wherein resuming replication comprises instructing a virtual machine corresponding to the virtual machine disk to use the virtual machine disk on the subsequent data store at the primary site.

17. The computer-implemented method of claim 15, wherein the instruction also causes a merger of the snapshot and the virtual machine disk.

18. The computer-implemented method of claim 17, wherein the merger is replicated to the subsequent data store at the secondary site.

19. A system for migrating replicated virtual machine disks, the system comprising:
- a replication module programmed to replicate a virtual machine disk from an initial data store at a primary site to an initial data store at a secondary site to create a replicated virtual machine disk;
- an identification module programmed to identify a request to migrate the virtual machine disk within the primary site;
- a pausing module programmed to pause replication of the virtual machine disk in response to identifying the request;
- a mirroring module programmed to mirror, in response to identifying the request:
- the virtual machine disk from the initial data store at the primary site to a subsequent data store at the primary site;
- the replicated virtual machine disk from the initial data store at the secondary site to a subsequent data store at the secondary site;
- wherein the replication module is further programmed to, upon mirroring both the virtual machine disk and the replicated virtual machine disk, resume replication of the virtual machine disk by replicating the virtual machine disk from the subsequent data store at the primary site to the subsequent data store at the secondary site;
- at least one processor configured to execute the replication module, the identification module, the pausing module, and the mirroring module.

20. A non-transitory computer-readable medium comprising one or more computer-executable instructions that, when executed by at least one processor of a computing device, cause the computing device to:
- replicate a virtual machine disk from an initial data store at a primary site to an initial data store at a secondary site to create a replicated virtual machine disk;
- identify a request to migrate the virtual machine disk within the primary site;
- in response to identifying the request:
- pause replication of the virtual machine disk;
- mirror the virtual machine disk from the initial data store at the primary site to a subsequent data store at the primary site;

mirror the replicated virtual machine disk from the initial data store at the secondary site to a subsequent data store at the secondary site;

upon mirroring both the virtual machine disk and the replicated virtual machine disk, resume replication of the virtual machine disk by replicating the virtual machine disk from the subsequent data store at the primary site to the subsequent data store at the secondary site.

\* \* \* \* \*